Oct. 29, 1957
B. W. WILSON
2,811,274
SHEET METAL CONTAINER, AND CIRCUMFERENTIAL
JOINT INCORPORATED THEREIN
Filed July 11, 1955
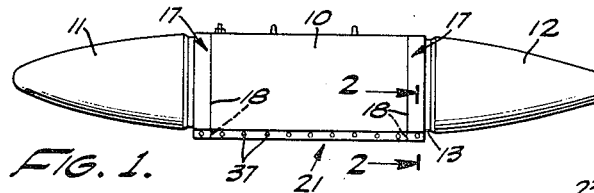
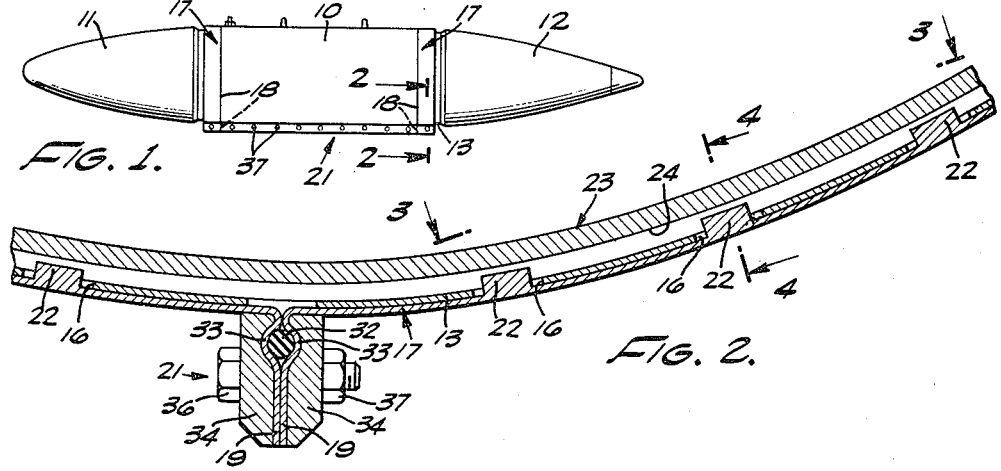
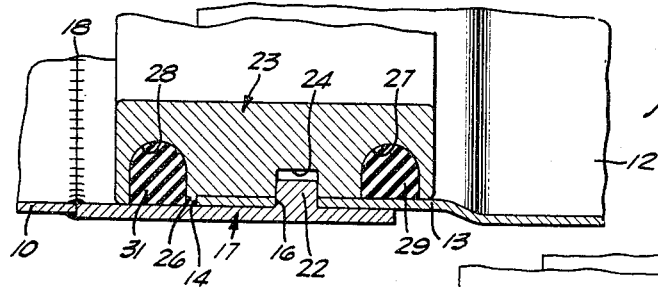
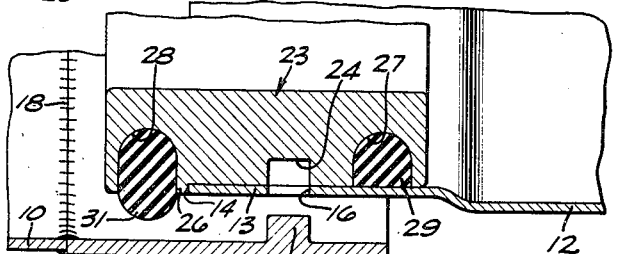
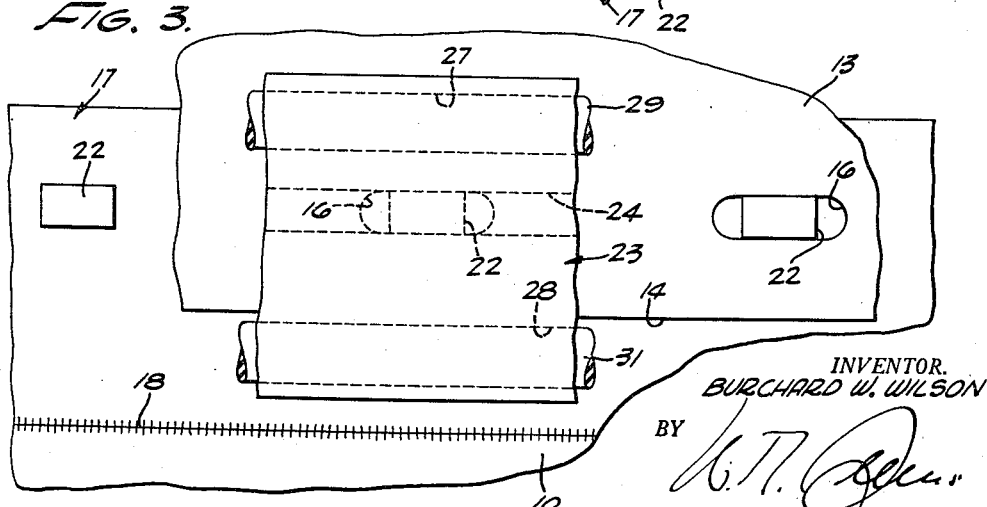
INVENTOR.
BURCHARD W. WILSON
BY
ATTORNEY page text …

United States Patent Office 2,811,274
Patented Oct. 29, 1957

2,811,274

SHEET METAL CONTAINER, AND CIRCUMFERENTIAL JOINT INCORPORATED THEREIN

Burchard W. Wilson, Pomona, Calif., assignor to Royal Jet, Inc., Alhambra, Calif., a corporation of California Application July 11, 1955, Serial No. 521,117

14 Claims. (Cl. 220—5)

This invention relates to a sheet metal liquid container, and to a circumferential joint incorporated therein. More particularly, the invention relates to joints between the sections of containers such as jettisonable fuel tanks, fire bombs and the like.

The problem of forming the circumferential joints of sheet metal tanks and containers, and more particularly of jettisonable fuel tanks and fire bombs carried by military aircraft, has been extremely difficult to solve for a number of reasons. In the first place, the circumferential joints between the tank sections must be extremely strong and leak proof, particularly in the case of jettisonable external wing tanks which are subject to extreme stresses and vibrations such as are set up at supersonic speeds. In the second place, the circumferential joints must be capable of being assembled in an extremely short period of time, sometimes by relatively unskilled personnel. This is because vast numbers of jettisonable fuel tanks and fire bombs, etc., after being shipped in knocked down and stacked relation from the factory to airfields disposed in all parts of the world, must be put together by army personnel who, in some instances, are not particularly skilled in the assembly operation. It will therefore be understood that if the circumferential joints are so complex that hours are required for assembly of each tank or bomb, a substantial amount of military manpower will be diverted from other uses and thus wasted. In the third place, and very importantly, the circumferential joints must be such that the tank, or a number of tanks may be stacked together during shipment in a very high-nesting relationship such that shipping space is minimized.

In order to achieve the high-nesting relationship by which corresponding components of a number of tanks may be stacked or telescoped together to thus conserve shipping space, jettisonable fuel tanks for aircraft have previously been designed with a nose section, a tail section and a generally cylindrical center section extending between the nose and tail sections. The center section is formed with a longitudinal split or seam which is spread progressively apart, during packaging for shipment, in order to adjust the diameters of the various stacked center sections to permit the telescoping or nesting operation. However, previous jettisonable aircraft fuel tanks were designed so that during assembly at the airfield the longitudinal center section joints were formed independently of the circumferential joints between the center section and the nose and tail sections. It follows that it was necessary to provide a special means, substantially completely independent of the longitudinal center section joint, for forming the circumferential joints.

In view of the above factors characteristic of circumferential joints and containers incorporating the same, it is an object of the present invention to provide a sheet metal tank in which the circumferential joints are formed at the same time as the longitudinal joint in the center section, and in which the longitudinal and circumferential joints are mutually interrelated in such manner that the resulting tank is extremely strong yet extremely simple to assemble.

An additional object is to provide a circumferential joint between the generally cylindrical end portions of sheet metal sections of a tank, and in which a seal and abutment ring is provided and is held against longitudinal displacement by the same means which effect interlocking between the end portions of adjacent tank sections.

A further object is to provide circumferential joints in which the receptacle means at the wide ends of the nose and tail sections take the form of circumferentially spaced openings in the skin sections themselves, these openings being adapted to receive in interlocking relation the inwardly extending projections provided on outer clamping and connecting rings which are welded to the ends of the center section.

These and other objects and advantages of the invention will be more fully set forth in the following specification and claims considered in connection with the attached drawing to which they relate.

In the drawing:

Figure 1 is a side elevational view of a jettisonable fuel tank for aircraft and embodying the present invention;

Figure 2 is an enlarged fragmentary transverse sectional view taken generally along line 2—2 of Figure 1;

Figure 3 is an enlarged fragmentary plan view taken from station 3—3 indicated in Figure 2;

Figure 4 is an enlarged fragmentary longitudinal sectional view taken along line 4—4 of Figure 2; and Figure 5 is a view corresponding to Figure 4 but illustrating the positions of the circumferential joint components prior to assembly and tightening of the longitudinal joint.

Referring now to the drawing, and particularly to Figure 1, the sheet metal container is illustrated in the form of a jettisonable fuel tank adapted to be carried beneath the wing of a military aircraft, and comprising a generally cylindrical center section 10 and generally tapered or conical end sections 11 and 12. The end section 11 is illustrated as the nose section, whereas end section 12 is shown as the tail section, it being understood that in each instance the circumferential joint with the end of center section 10 is the same except for being right and left. Since these circumferential joints are the same, only the one between center section 10 and tail section 12 will be described in detail, and with particular reference to Figures 2-5. The tank components are preferably formed of aluminum.

As illustrated in Figures 4 and 5, the wide end of tail section 12 is necked down slightly to form a generally cylindrical end portion 13, the amount of necking down being approximately equal to the skin thickness. End portion 13 is provided, in a transverse plane spaced away from the free edge 14 thereof, with receptacle means taking the form of a plurality of circumferentially spaced elongated openings 16. Openings 16 are preferably formed at approximately every ten degrees throughout the circumference of tail portion 13, and have rounded ends as illustrated in Figure 3.

An outer clamping and connecting ring 17, having a short cylindrical body corresponding generally in thickness and diameter to the end of center section 10 and butt welded thereto at 18, is disposed in overlapping relationship relative to the end portion 13 of tail 12. It is to be understood that the cylindrical body of outer ring 17 is split at one point and provided with radially outwardly extending flanges 19 (Figure 2) which are butt welded to corresponding center section flanges at the longitudinal joint 21 of the center section. Thus, the body of outer ring 17 constitutes a continuation of the end portion of center section 10, both as to its cylindrical portion and as to its flanged portion at the longitudinal joint 21.

Formed circumferentially on the inner surface of outer clamping ring 17, and spaced away from the free edge thereof, are interlock means comprising a plurality of radially inwardly extending protrusions, plugs or projections 22. The protrusions 22 are located at intervals corresponding to the spacing between openings 16, or ten degrees in the example, and are rectangular in shape having a width corresponding to that of openings 16. However, and as shown in Figure 3, the protrusions 22 are somewhat shorter than the openings 16 so that they may be readily inserted therein to the position shown in Figures 2 and 4. It will be understood that when the protrusions 22 are inserted into openings 16, an interlock will be provided between ring 17 (and thus the end of center section 10) and the end portion 13 of tail section 12. This interlock will be maintained so long as center section 10 and clamping ring 17 have a diameter sufficiently small to prevent movement of the protrusions or projections 22 out of their associated openings.

A relatively thick short cylindrical seal and abutment ring 23 is telescoped radially inwardly of the overlapping portions of clamping ring 17 and end portion 13. Ring 23 has formed on its exterior generally cylindrical surface a circumferential channel or groove 24 of rectangular section and corresponding in width to that of projections 22 and openings 16. Preferably, channel or groove 24 is relatively deep so that there is no possibility of projections 22 engaging its bottom wall. A radial shoulder 26 is formed on the outer wall of ring 23 for engagement by the free edge 14 of end portion 13. The relative locations of shoulder 26 and channel 24 are such that the channel will be exactly registered with openings 16 when the shoulder is abutted by free edge 14.

Seal and abutment ring 23 are maintained against longitudinal shifting by the projections 22 which, after assembly of the joint, are inserted therein as shown in Figures 2 and 4. It is a feature of the invention that no other means need be provided to effect accurate positioning of the seal and abutment ring 23 and to maintain it against shifting out of the end portion 13 into which it is partially telescoped.

Second and third circumferential channels or grooves 27 and 28 are provided in the exterior generally cylindrical surface of seal and abutment ring 23, one on one side of channel 24 and shoulder 26, and one on the other side thereof. This first channel or groove 27 has mounted therein a sealing ring 29, preferably an elastomeric or plastic O-ring or the like, which bears sealingly against the inner surface of end portion 13. Similarly, the second channel or groove 28, which is located between shoulder 26 and the edge of ring 23 relatively adjacent weld 18, has mounted therein a seal ring 31 which bears against the inner surface of the cylindrical body of outer clamping ring 17. The seal rings 29 and 31 cooperate effectively to prevent leakage of liquid through the joint.

The longitudinal joint 21 comprises, in addition to the previously indicated radial flanges, an elongated sealing element 32, preferably a straight O-ring, which is inserted in cooperating channel portions 33 of the flanges. Clamping bars 34 are provided on opposite sides of the flanges for the full length of the joint, and bolts 36 are inserted through the clamp bars and the flanges at longitudinally spaced points, the bolts having nuts 37 at their threaded ends.

It is to be understood that suitable sealing means, not shown, are provided at the end of sealing element 32 in order to sealingly associate such end with seal ring 31 and thus prevent any leakage of liquid through the intersection between the circumferential and longitudinal joint.

In assembling the tank and tank joints in accordance with the present invention, seal ring 29 is first mounted in channel 27, after which the rigid seal and abutment ring 23, which may be a continuous metal (preferably aluminum) extrusion or casting, is inserted or telescoped in the necked down end portion 13 of tail section 12. Such insertion may be facilitated by greasing the ring 29, and continues until shoulder 26 abuts against free edge 14, at which time it is known that channel 24 is registered with openings 16. The seal ring 31 is then mounted in channel 28, and clamping and connecting ring 17 is wrapped exteriorly around end portion 13 as indicated in Figure 5. Such wrapping is possible due to the fact that the longitudinal joint 21 has not yet been formed, so that a substantial spreading of the center section 10 and clamping ring 17 is possible in order to increase their diameters.

Protrusions or projections 22 are then inserted through the respective openings 16 and into channel 24 to hold the latter against longitudinal shifting. Thereafter, it is merely necessary to insert the bolts 36 and tighten nuts 37 thereon, which operates to force the inner surface of clamping ring 17 into sealing engagement with seal ring 31 and distort the same to the condition shown in Figure 4. Tightening of the nuts also operates to bring the inner clamping ring surface into close abutment with the outer surface of end portion 13, as well as to bring channel portions 33 into sealing engagement with the previously inserted seal element 32.

It will thus be seen that the circumferential and longitudinal joints are interdependent and interrelated both as regards sealing and as regards maintaining the projections 22 in interlocked relation in openings 16 and channel 24. The tank and joints may thus be assembled in a very short period of time and by relatively unskilled personnel, it being understood that the weld 18 is made at the factory and not by personnel in the field. Although the longitudinal and circumferential joints are thus extremely simple and may be made in a very short period of time and with effective sealing, the resulting tank is sufficiently strong to withstand the vibration and shock present when the tank is supported beneath the wing of a supersonic aircraft.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A joint between the end portions of skin sections of a fluid tight sheet metal container, one of said end portions being longitudinally split to form opposed longitudinal edges, which comprises a clamping and connecting ring connected to said one end portion by a fluid-tight seam and having a plurality of circumferentially spaced inwardly extending protrusions thereon, a plurality of circumferentially spaced receptacle openings provided on the other of said end portions in positions to mate with said protrusions, said ring being wrapped around said other end portion so that said protrusions extend into said receptacle openings and interlock therewith, and means located externally of said skin sections to form a joint between said opposed longitudinal edges and thus to prevent said protrusions from moving out of said receptacle openings.

2. The invention as claimed in claim 1, in which a rigid sealing and abutment ring is mounted interiorly of said other end portion and is provided with resilient sealing means on opposite sides of said receptacle openings.

3. The invention as claimed in claim 2, in which said sealing and abutment ring is provided with receptacle means to receive said protrusions, and is thus locked against longitudinal shifting.

4. A circumferential joint between the generally cylindrical end portions of skin sections of a thin-walled fluid tight container, one of said end portions being longitudinally split to form opposed longitudinal edges, which comprises a clamping and connecting ring permanently joined with said one end portion and having circumferentially spaced inwardly extending protrusion means thereon, receptacle means permanently joined with the other of said end portions prior to assembly of the circumferential joint, said ring being wrapped around said other end portion so that said protrusion means extend into said receptacle means in interlocking relation, and means to form a joint between said opposed longitudinal edges of said one end portion to clamp said edges together and prevent said protrusion means from shifting out of said receptacle means.

5. A joint between the generally cylindrical end portions of skin sections of a fluid tight sheet metal container, one of said end portions being longitudinally split to form opposed longitudinal edges, which comprises circumferentially spaced inwardly extending protrusion means provided on said one end portion, receptacle means permanently associated with the other of said end portions prior to assembly of the joint, said one end portion being disposed relative to said other end portion so that said protrusion means extends inwardly into said receptacle means in interlocking relation, and means to form a joint between said opposed longitudinal edges and thus to prevent said protrusion means from shifting out of said receptacle means.

6. The invention as claimed in claim 5, in which sealing means encircling said cylindrical skin sections to either side of said protrusion means are provided to prevent leakage of fluid through the joint.

7. A joint between the generally cylindrical end portions of skin sections of a sheet metal container, one of said end portions being longitudinally split to form opposed longitudinal edges, which comprises first receptacle means associated with the other of said end portions, a rigid sealing and abutment ring, second receptacle means associated with said sealing and abutment ring, inwardly projecting means associated with said one end portion and extending inwardly into said first receptacle means and said second receptacle means, and means to form a joint between said longitudinal edges.

8. The invention as claimed in claim 7, in which said first receptacle means are openings in said other end portion, and said inwardly projecting means extend through said openings into said second receptacle means.

9. The invention as claimed in claim 8, in which sealing means are mounted on said sealing and abutment ring on opposite sides of said openings.

10. A joint between a center section and an end section of a thin-walled jettisonable tank, said center section being generally cylindrical and being longitudinally split to form opposed longitudinal edges, said end section being formed with a generally cylindrical end portion having approximately the same diameter as said center section; which comprises a sealing and abutment ring having a generally cylindrical exterior surface the diameter of which equals the inner diameter of said end portion, said exterior surface having three axially spaced circumferential channels formed therein, seal rings mounted in the outer two of said channels, said sealing and abutment ring being partially telescoped into said end portion so that two of said channels are disposed radially inwardly of said end portion, a plurality of circumferentially spaced openings formed in said end portion at the central one of said channels, a cylindrical outer clamping and connecting ring welded at one edge to the end of said center section, the other edge of said clamping nad connecting ring being lapped over said end portion, projections formed on said clamping and connecting ring and projecting inwardly through said opening into said central channel, and means to sealingly join said longitudinal edges.

11. The invention as claimed in claim 10, in which a shoulder is formed on said exterior surface of said sealing and abutment ring between two of said channels, said shoulder serving as a stop for the edge of said end portion, and in which one of said seal rings engages said end portion and the other engages said outer clamping and connecting ring.

12. A thin-walled jettisonable tank, comprising a generally cylindrical center section and generally conical or tapering nose and tail sections, said nose and tail sections having cylindrical end portions corresponding approximately to the ends of said center section, said center section being longitudinally split to form opposed longitudinal edges, a longitudinal joint between said longitudinal edges including means for holding said edges clamped together, and circumferential joints between said end portions and said center section ends, each of said circumferential joints comprising first interlock means associated with a center section end, and second interlock means permanently associated with one of said end portions prior to assembly of the tank, said interlock means being held in interlocking relation when the edges of said longitudinal joint are held clamped together.

13. The invention as claimed in claim 12, in which a rigid sealing and abutment ring is provided radially inwardly of said interlock means for each circumferential joint, and in which seals are provided on said sealing and abutment ring to prevent leakage of liquid through the circumferential joint.

14. The invention as claimed in claim 13, in which said interlock means additionally lock said sealing and abutment ring against longitudinal shifting.

References Cited in the file of this patent

UNITED STATES PATENTS

| | | |
|---|---|---|
| 1,489,274 | Petty | Apr. 8, 1924 |
| 2,482,558 | Scaringella | Sept. 20, 1949 |
| 2,596,839 | Clausen | May 13, 1952 |